Dec. 24, 1957     F. D. COVELY 3RD     2,817,265
LIGHT DIVIDING APPARATUS
Filed Nov. 25, 1953     2 Sheets-Sheet 1
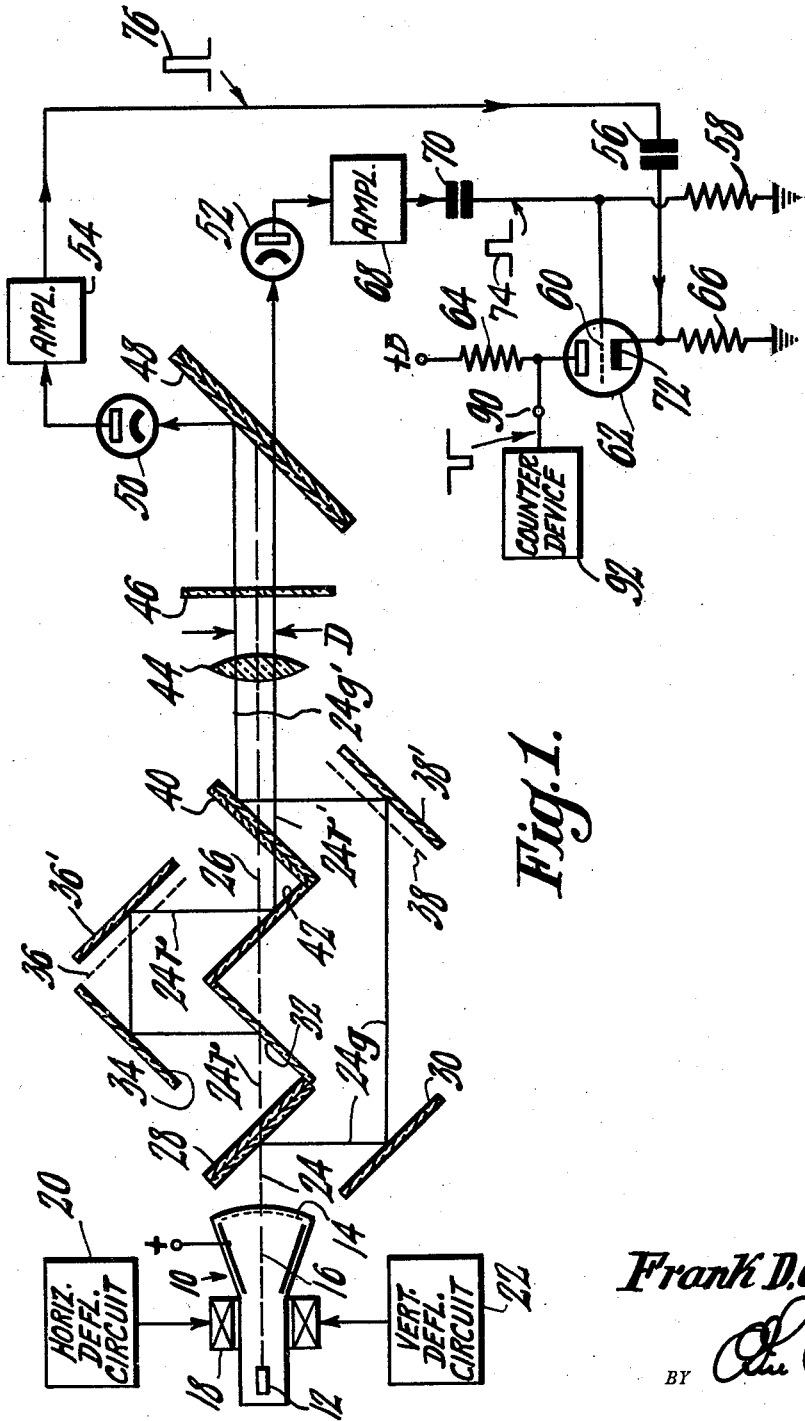
INVENTOR.
*Frank D. Covely, 3RD*
BY
ATTORNEY

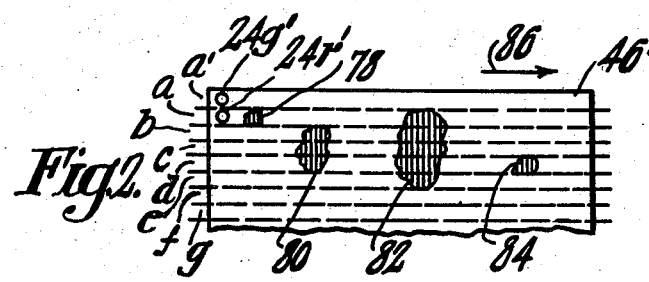
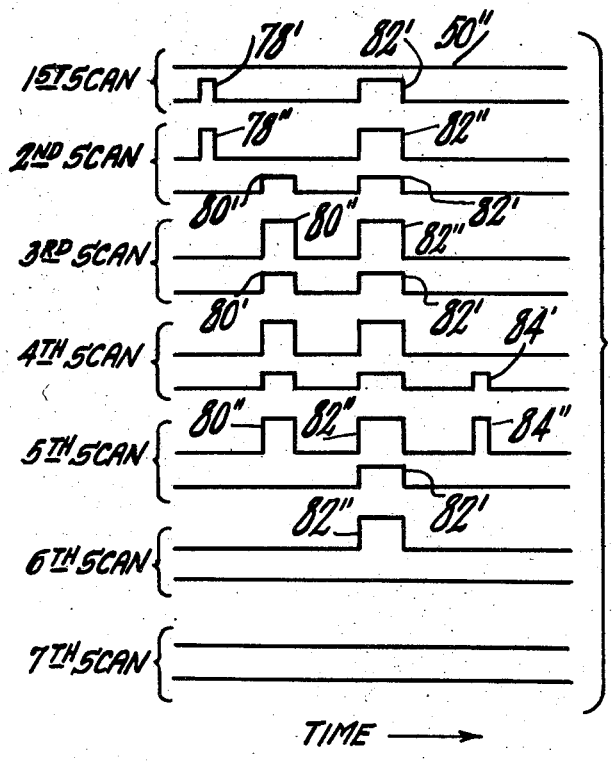
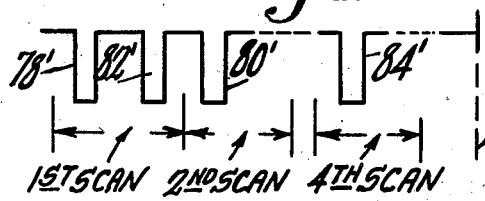
INVENTOR.
Frank D. Covely, 3RD

United States Patent Office 2,817,265
Patented Dec. 24, 1957

2,817,265

LIGHT DIVIDING APPARATUS

Frank D. Covely 3rd, Haddonfield, N. J., assignor to Radio Corporation of America, a corporation of Delaware Application November 25, 1953, Serial No. 394,362

9 Claims. (Cl. 88—14)

The present invention relates to a new and improved optical system and, more particularly, to such a system which is capable of producing, from a single light source, a plurality of light beams spaced apart by a fixed amount.

In the art of "flying spot scansion" wherein a cathode ray device is employed as a source of light, it is often necessary or, at least, desirable to provide a plurality of such flying spots spaced apart an unchanging or constant distance. Prior methods of accomplishing this aim have, for example, required apparatus involving a separate light source for each spot together with separate focusing means therefor, thus rendering the cost of the equipment excessive.

It is, therefore, a primary object of the present invention to provide an optical system for producing, through the agency of a relatively few optical elements and from a single light source, a plurality of spaced, parallel light beams.

Another object hereof is the provision of a flying spot scansion apparatus including a single cathode ray kinescope by way of illustration, and optical means for dividing the light therefrom into a plurality of parallel beams which are directed along spaced paths.

A further object of the invention is the provision of apparatus as set forth, which apparatus functions in such manner that the plurality of light beams produced from the single source are readily identifiable with respect to each other. Stated otherwise, each of the light beams retains its individual identity after the division.

In general, the present invention, according to a specific embodiment as described herein, provides a single source of panchromatic light, in the form of a cathode ray kinescope with means such as color selective light-dividing elements for separating the light into separate component colors. Each of the component colors is assigned an optical path including reflective surfaces for directing light along a predetermined path. A single objective lens thus serves to focus the plurality of light beams onto a field such that the light beam of one component color is focused on the field at a point which is spaced a fixed distance from the beam of light of another component color. Moreover, as will appear, the spacing introduced by the apparatus of the present invention may be in either the horizontal or vertical direction or at an angle to either.

One valuable use to which the apparatus of the present invention may be put is in the field of particle counting such as is practiced, for example, in chemical or biological tests wherein particles of random size and location are to be counted. A specific embodiment of particle-detecting and counting apparatus may be provided, as will be explained, through the flying spot optical system referred to supra, and combined with certain simple and well-known equipment.

Thus, it is a further object of the invention to provide a flying spot optical apparatus capable of producing a plurality of spaced spots, which spots may be used as counting media.

Additional objects and advantages of the present invention will become apparent and further suggest themselves to persons skilled in the art from a study of the following detailed description of the accompanying drawings, in which:

Fig. 1 is a diagrammatic illustration of one form of the invention as embodied in particle-counting apparatus;

Fig. 2 illustrates a slide containing a random distribution of particles; and

Figs. 3 and 4 are electrical waveforms useful in explaining the operation of the apparatus of Fig. 1.

Referring to the drawing and, more particularly, to Fig. 1 thereof there is shown an optical system in accordance with the present invention as embodied in a novel particle-detecting and counting apparatus. A kinescope 10 of conventional form having an electron source 12 and a luminescent phosphor coating 14 serves as a source of light. In order to cause an electron beam 16 within the tube to scan a rectangular raster there are provided electromagnetic deflection coils 18 which are energized with horizontal frequency sawtooth waves from source 20 and with vertical deflection rate sawtooth currents from source 22. Line 24 indicates the path of the panchromatic light emanating from kinescope 10. Disposed at substantially 45° with respect to the axis of light beam 24 which is, as shown, coincident with the axis of the optical system as indicated by dotted line 26, is a color selective light dividing element 28.

Element 28 may, by way of illustration, comprise a dichroic reflector such as that described and claimed in the U. S. patents to G. L. Dimmick entitled Dichroic Reflectors, 2,379,790, granted July 3, 1945, and Color Selective Reflector, 2,412,496, granted September 10, 1946. The action of a dichroic reflector, being now well known, need not be described herein. In general, however, such a device comprises a thin film of material which is transparent to light of a given color but quite reflective to light of another color. By such means as the dichroic reflector 28, the panchromatic light 24 is divided into its green component 24g and its red component 24r. The green component, 24g, reflected by dichroic element 28 is, in turn, reflected in a horizontal direction by means of the fully reflecting mirror 30 which is disposed in a plane parallel to that of the reflector 28. A second fully reflecting mirror surface 32, at right angles to dichroic reflector 28, serves to reflect the red component of light 24r vertically to the reflecting surface of mirror 34 also perpendicular to the dichroic reflector. Dotted line 36 and dotted line 38 indicate those locations of reflecting surfaces which, if adhered to, would result in causing the red and green light components 24r and 24g, respectively, to strike dichroic reflector 40 in registry. That is to say, mirrors 36' and 38' which are illustrated as being spaced equal distances from the dotted lines 36 and 38, respectively, would, if in coincidence with such dotted lines, direct their associated light beams toward the combining element 40 in such manner that the beams would be in register along the axis 26. Since mirror 36' is spaced, as shown, from dotted line 36, it reflects the light beam 24r downwardly to mirror surface 42 in such manner that the red light which passes through dichroic reflector 40 does so along path 24r' which is, as may be seen from the drawing, spaced below the axis 26 of the system. Similarly, mirror 38' reflects the green light beam 24g upward to dichroic element 40 which, in turn, reflects that beam horizontally along path 24g'. Path 24g' is spaced a distance above axis 26 equal to the distance which the red beam 24r' is spaced below the axis. An objective lens 44 illustrates diagrammatically the fact that a single lens may be employed for focusing both the red and green light beams 24r' and 24g' onto the field plane 46, since the optical path lengths are equal.

While it has not been stated specifically with respect to each of the reflectors in Fig. 1, it should be borne in mind that each of them is disposed at 45° to the axis 26 of the system and in the direction illustrated in the drawing. As thus far described, it will be appreciated that the apparatus of Fig. 1 is capable of producing from a single source of panchromatic light such as the kinescope 10, a plurality of light beams (viz., 24g' and 24r') which are spaced apart a fixed distance. This distance is denoted by reference character D and is exaggerated in the drawing for purposes of illustration. Since the orientation of the scanning raster produced by the scanning circuits 20 and 22 in conjunction with the electromagnetic coils 18 may be selected in any direction, it should be understood that the plurality of light beams may be spaced the distance D in substantially any direction. For purposes of illustrating one operative apparatus embodying the invention, it may be assumed that the rectangular raster formed by the electron beam 16 in kinescope 10 is oriented such that each horizontal sweep of the beam occurs in a plane which is perpendicular to the plane of the drawing. Thus, the two light beams 24g' and 24r' will be spaced from each other a distance D in the vertical direction. By rotating the orientation of the scanning apparatus 90°, for example, the spacing may be caused to occur in the horizontal direction, as should be apparent. In such use, the horizontally leading spot may be useful in "predicting" the occurrence of an event to condition the lagging spot. Since both of the light beams are produced from a single source and travel through the same optical system including objective lens 24, the spacing between the two beams will remain substantially constant throughout the raster scanned by the electron beam 16.

In the following description of the remaining apparatus of Fig. 1, the image inversion which a single element lens introduces will be neglected in order to simplify the description of the apparatus and since such inversion does not alter the final result. A third dichroic reflector 48 is also disposed at 45° to the axis 26 of the system and is arranged so that it transmits substantially only the red light beam 24r' and reflects the green light beam 24g'. Disposed in light-receiving relation to the dichroic reflector 48 are a pair of light-sensitive devices illustrated as photocells 50 and 52 which may, if desired, be chosen as photocells which are most sensitive to light of a given color and, more particularly, green light and red light, respectively. The output of photocell 50 is applied to a conventional amplifier 54 whose output is, in turn, coupled via capacitor 56 and resistor 58 to the cathode 72 of an electronic tube 62. The anode of tube 62 is connected through a load resistor 64 to a source of positive operating potential indicated as +B, while its cathode is connected to a point of fixed potential (such as ground) through a cathode biasing resistor 66. The output of the red photocell 52 is amplified by suitable means indicated by block 68 and is applied by a capacitor 70 and resistor 58 to the control electrode 60 of tube 62.

Assuming, in the operation of the apparatus of Fig. 1, that a slide such as a biological culture containing random sized and randomly located opaque particles is placed in the field plane 46, the slide being otherwise transparent, the number of particles in the slide may be detected in the following manner: If it be assumed for purposes of the illustrative example that the vertical coordinate of deflection of the electron beam 16 is from top to bottom, the red light beam 24r' will "lead" the green light beam 24g' as the field 46 is being scanned. Each time the red light beam encounters a particle in the slide, the light will be modulated to produce a change in the current flowing through photocell 52. Such modulation of the light will, therefore, cause the photocell output, after amplification by circuit 68, to appear as the positive pulse 74, for example. Similarly, when the green light beam 24g' encounters a particle while traversing the slide, it will be modulated in such manner as to cause the current in photocell 50 to produce a pulse which after amplification will have the form shown by the positive pulse 76 at the output of block 54.

Fig. 2 illustrates a portion of a slide indicated by reference numeral 46', which slide contains a plurality of particles of different sizes and located at random. The spots are shown at 78, 80, 82 and 84. The circular areas 24r' and 24g' correspond to the spots produced by light beams 24r' and 24g' on the slide 46'. While the spots are not displaced in the vertical direction as much as is shown in an exaggerated manner by the lines in Fig. 1, they are located one above the other, as illustrated in Fig. 2. Assuming, therefore, that the light spots 24r' and 24g' sweep across the slide 46' from left to right (i. e., in the direction shown by arrow 86) and assuming further that the first line scanned by spot 24 is located in the path a, it will be understood that the lagging spot 24g' will be located one path width above it. That is, when spot 24r' is scanning along path a, spot 24g' will scan path a'. Also when spot 24r', on its second scan, travels along path b, spot 24g' will travel along path a. During the first horizontal scan, therefore, light spot 24r' will encounter particles 78 and 82 to produce, in the output of amplifier 68, two pulses 78' and 82' (Fig. 3). During the first scan, spot 24g' will not encounter any of the particles, so that its photocell current will remain unchanged, this condition being illustrated by the straight line 50". During the second scan, spot 24r' will, in traversing path b, encounter particle 80 (for the first time) and particle 82 (for the second time) to produce pulses 80' and 82'. Also during the second scan, spot 24g' will encounter and be modulated by particles 78 and 82 to produce positive pulses 78" and 82". From the foregoing description of the first two scansions, the pattern of pulses should now be apparent from the remaining waveforms of Fig. 3. Thus, during the third scan, both light spots will encounter and be modulated by particles 80 and 82 to produce the pulses shown at 80', 80", 82', and 82". During the fourth scan, however, the leading spot 24r' will encounter particle 84 to produce a pulse 84' in addition to the other two pulses. On the fifth scan, the leading spot 24r' will encounter only particle 82, causing photocell 52 to produce a pulse 82'; the lagging spot 24g' will again encounter particles 80, 82 and 84 to produce corresponding pulses bearing the same numerals with the double prime (") notation. During the sixth scan, traveling along path f, spot 24r' will not encounter any particles and will, therefore, produce no change in the output of its associated photocell. Spot 24g', however, during the sixth scan is traveling along path e and will encounter particle 82 to produce another pulse 82". During the seventh scan, neither of the spots encounters any particles and the output waveforms of the photocells will include no pulses, as shown in Fig. 3.

Referring again to Fig. 1, it is seen that the output of the leading photocell 52 and associated amplifier 68 is a positive-going pulse of rather small amplitude compared to that of the corresponding pulse at the output of the green photocell amplifier 54. The difference in amplitudes may be effected by assigning different gains to the amplifiers. The output of amplifier 54 is coupled to the cathode 72 of electronic tube 62 and, as has been stated, the output of amplifier 68 is coupled to the output of control grid 60 of that tube. Assuming the values of +B, plate load resistor 64 and cathode resistor 66 to be properly chosen, tube 62 will normally be biased to cutoff by the quiescent current flowing therethrough. (In place of the self-bias, a fixed bias may also be employed.) The positive pulses from the red amplifier 68 applied to control grid 60 are of sufficient amplitude to render tube 62 conductive for their duration. On the other hand, the positive going pulses from the green amplifier 54, when applied to the cathode 72, merely increase the negative grid-cathode bias and do not render the tube conductive.

Additionally, it should be understood that when pulses from the two amplifiers coincident in time are applied to the control grid and cathode of tube 62, the greater amplitude positive pulse applied to the cathode form amplifier 54 will negate the lower amplitude positive pulse applied from the red amplifier to control grid 60, thereby preventing the latter pulse from producing conduction of the tube. Hence, the output of tube 62 at terminal 90 will contain a negative-going pulse corresponding to each positive pulse applied to its control grid from the red amplifier and only when such pulse from the red amplifier does not coincide in time with a pulse from the green amplifier. The output of tube 62 is, in turn, coupled to a counter device 92 which may be any device capable of counting and furnishing a total for the number of pulses received from the tube 62.

The above-described action of tube 62 in distinguishing pulses from the red green photocell channels is effective to produce a counting pulse only when the leading light spot 24r′ encounters a particle during scan and, additionally, only when the lagging spot 24g′ does not encounter that particle on the same scan. Hence, only one output pulse at terminal 90 occurs for each pulse, as shown in Fig. 4, which illustrates a waveform such as that which would appear at terminal 90, including the pulses 78′, 80′, 82′ and 84′.

By reason of the above description, it should be apparent that the particle counting apparatus disclosed in Fig. 1 affords a relatively simple yet effective means for counting particles regardless of size and location. The fact that a single light source furnishes the plurality of scanning spots serves, moreover, to render the action of the apparatus more certain, than would be possible with equipment using a separate light source for each of the spots. Furthermore, the invention, by virtue of its production of a plurality of scanning spots from a single source renders unnecessary the inclusion of any synchronizing means such as would be required were a plurality of light sources to be employed.

While the invention has been described in accordance with its application to counting particles, by way of illustration, it should be understood that the light-dividing means for producing a plurality of spots having a constant spacing is applicable to other fields.

Having thus described my invention, what I claim as new and desire to secure by Letters Patent is:

1. Apparatus comprising a source of light; color selective light-dividing means for dividing a beam of light from said source into a plurality of beams, each of a selected component color; reflective means disposed in light-receiving relationship to said light-dividing means for defining a separate light path for each such selected component color light beam; and means including additional reflective means and a color selective element disposed obliquely and arranged in such paths to render such paths of unequal length for directing such plurality of selected component color light beams along parallel paths spaced apart a fixed amount.

2. The invention as defined by claim 1 wherein said color selective light-dividing means comprises a dichroic reflector.

3. The invention as defined by claim 1 wherein said source of light comprises a cathode ray kinescope and wherein said color selective light-dividing means comprises a dichroic reflector disposed at an oblique angle with respect to the axis of said kinescope.

4. The invention as defined by claim 1 wherein said last-named means comprises a separate reflector in each such separate light path, each of such separate reflectors being disposed obliquely to its path and spaced a fixed distance from said first named reflective means, said fixed distances being respectively different and bearing an established relationship to said fixed amount by which said parallel paths are spaced apart.

5. Apparatus comprising a cathode ray kinescope for emitting a beam of light; a color selective light-dividing element disposed in light-receiving relation with respect to said kinescope for dividing light therefrom into a plurality of component color light beams traveling along divergent paths; a second color selective element; reflective means in each of such divergent paths for causing such divergent component color light beams to approach said second color selective element at substantially right angles to each other and at substantially 45 degrees with respect to said element; said reflective means defining paths of such length that the separate component color light beams strike said second element at points separated by a fixed distance.

6. Apparatus comprising means for providing a scanning beam of light; a color selective light-dividing element disposed in light-receiving relation with respect to said means for dividing a beam of light therefrom into a plurality of component color beams traveling along divergent paths; an objective lens having an axis and adapted to focus light from said means in a plane; a second color selective element mounted at substantially 45 degrees with respect to such axis; reflective means in said divergent paths substantially perpendicular to each other for causing such divergent component color light beams to approach said second color selective element at substantially right angles to each other and at substantially 45 degrees with respect to said element, said reflective means being spaced fixed distances, respectively, from said axis such that the separate component color light beams strike said element at points separated by a fixed distance, said element being adapted to direct said separate beams along substantially parallel paths toward said objective lens.

7. Apparatus comprising, in combination, a source of light; color selective light-dividing means for dividing a beam of light from said source into a plurality of beams, each of a different component color; reflective means disposed in light-receiving relationship to said light dividing means and defining a separate light path for each such component color light beams; means including additional reflective means for directing such plural component color light beams along parallel paths; an objective lens having an axis; and means including a color selective element arranged obliquely in said plurality of light paths for directing said plural light beams along paths parallel to said lens axis but at different distances therefrom, whereby said lens may focus said plural light beams on points in an object field separated by a fixed distance.

8. The invention as defined by claim 7 including a light responsive device for each of said plural component color light beams and means for directing each such beam from said field to its associated light responsive device.

9. The invention as defined by claim 8 wherein each of said light responsive means is capable of producing a pulse signal, and wherein there is included an electronic pulse distinguishing circuit having two inputs and an output terminal; means for coupling one of said light responsive devices to one of said input terminals and means for coupling the output of another of said light responsive devices to the other of said input terminals, said circuit including means for producing a pulse at said output terminal for each pulse applied to a selected one of its input terminals in the absence of a pulse at its other input terminal.

References Cited in the file of this patent

UNITED STATES PATENTS

| Number | Name | Date |
|---|---|---|
| 2,415,191 | Rajchman | Feb. 4, 1947 |
| 2,443,722 | Carlson | June 22, 1948 |
| 2,494,441 | Hillier | Jan. 10, 1950 |
| 2,560,351 | Kell et al. | July 10, 1951 |
| 2,648,250 | Zobel | Aug. 11, 1953 |
| 2,661,902 | Wolff et al. | Dec. 8, 1953 |
| 2,724,737 | Hogan | Nov. 22, 1955 |

FOREIGN PATENTS

| Number | Country | Date |
|---|---|---|
| 435,706 | Germany | Oct. 16, 1926 |